United States Patent [19]

Walker et al.

[11] Patent Number: 5,249,609
[45] Date of Patent: Oct. 5, 1993

[54] DEFLATION CONTROL SYSTEM AND METHOD

[75] Inventors: James M. Walker; L. Michael Ruzicka; James Beverly, all of Kalamazoo, Mich.

[73] Assignee: Eaton Corporation, Cleveland, Ohio

[21] Appl. No.: 629,043

[22] Filed: Dec. 14, 1990

Related U.S. Application Data

[60] Continuation of Ser. No. 518,278, May 3, 1990, abandoned, which is a continuation of Ser. No. 321,691, Apr. 10, 1989, abandoned, which is a division of Ser. No. 223,303, Jul. 25, 1988, abandoned.

[51] Int. Cl.$^5$ .................................... B60C 23/00
[52] U.S. Cl. ........................................ 141/4; 141/38; 141/1; 152/415; 73/146.2
[58] Field of Search ............... 141/1, 4, 38, 39, 47, 141/66, 83, 94, 95, 192, 197; 152/415–417; 340/442; 73/146–146.5; 137/12, 14, 224, 224.5

[56] References Cited

U.S. PATENT DOCUMENTS

| | | | |
|---|---|---|---|
| 4,333,491 | 6/1982 | Knubley | 137/224 X |
| 4,456,038 | 6/1984 | Gwaltney et al. | 141/95 |
| 4,510,979 | 4/1985 | Hjorth | 141/95 |
| 4,640,331 | 2/1987 | Braun et al. | 152/417 |
| 4,699,185 | 10/1987 | Cargould et al. | 141/1 |
| 4,763,709 | 8/1988 | Scholer | 152/416 |
| 4,765,385 | 8/1988 | McGeachy | 152/416 |
| 4,782,878 | 11/1988 | Mittal | 152/417 |

FOREIGN PATENT DOCUMENTS

| | | |
|---|---|---|
| 0137932 | 4/1985 | European Pat. Off. . |
| 0164917 | 12/1985 | European Pat. Off. . |
| 3720787 | 2/1988 | Fed. Rep. of Germany . |

OTHER PUBLICATIONS

Soviet Inventions Illustrated, Section P/Q, Week C14 Class Q11, May 14, 1980, No. D1058C114.

Primary Examiner—Henry J. Recla
Assistant Examiner—Casey Jacyna
Attorney, Agent, or Firm—H. D. Gordon

[57] ABSTRACT

A control system and method for controlling deflation operations in a CTIS (10, 200). During deflation to a selected pressure ($P_D$), the tires will be deflated to a target pressure ($P_T$) lower than the selected pressure and then inflated to the selected pressure.

3 Claims, 6 Drawing Sheets

DEFLATION CONTROL SYSTEM AND METHOD

This application is a continuation of application Ser. No. 518,278, filed May 3, 1990, now abandoned, which is a continuation of application Ser. No. 321,691, filed Apr. 10, 1989, now abandoned, which is a continuation of application Ser. No. 223,303, filed Jul. 25, 1988, now abandoned.

BACKGROUND OF THE INVENTION

1. Field of the Invention

The present invention relates to central tire inflation systems (CTIS), also known as on-board inflation systems and tire traction systems, wherein the inflation pressure of one or more vehicle tires may be controlled from a remote location (usually the vehicle cab) with the vehicle at rest and/or in motion and utilizing an on-board source of pressurized fluid (usually compressed air from the vehicle air brake compressor and/or a compressed air reservoir). In particular, the present invention relates to an adaptive control system and method for an on-board central tire inflation system which minimizes the time required to deflate a tire to a selected pressure and reduces the difference between tire pressure after deflation.

2. Description of the Prior Art

Central tire inflation systems, also known as tire traction systems, are well known in the prior art as may be seen by reference to U.S. Pat. Nos. 2,634,782; 2,976,906; 2,989,999; 3,099,309; 3,102,573; 3,276,502; 3,276,503; 4,313,483; 4,418,737; 4,421,151; 4,333,491; 4,456,038; 4,434,833; 4,640,331 and 4,678,017, the disclosures of all of which are hereby incorporated by reference. CTIS allow the operator to remotely manually and/or automatically vary and/or maintain the inflation pressure of one or more of the vehicle tires from the vehicle (usually a truck) air system, usually while the vehicle is in motion as well as when the vehicle is at rest.

It is well known that the traction of vehicles on relatively soft terrain (i.e. on mud, sand or snow) may be greatly improved by decreasing the inflation pressure within the tires. By decreasing the inflation pressure, the tire supporting surface (usually called the "footprint") will increase thereby enlarging the contact area between the tires and the terrain. Additionally, it is often desirable to decrease the tire pressure from the over-the-road or highway inflation pressure to increase riding comfort on rough roads. On the other hand, higher tire pressures decrease rolling resistance and tire carcass temperatures on smooth hard roads thereby increasing economy and safety. Accordingly, in cross country vehicles it is desirable to change the inflation pressure in the pneumatic tires to fit the terrain and is also desirable that a system be provided for changing the inflation pressure of the tires from an on-board source, while the vehicle is at motion or at rest and that the system be controlled from the vehicles operating cab.

In a particular type of CTIS, as illustrated and described in above-mentioned U.S. Pat. No. 4,640,331, a plurality of wheel ends (each comprising one or more tires) are each fluidly connected by a separate branch conduit to common central conduit which may be connected to a source of pressurized air for inflating the tires, to a source of regulated pressurized air for deflating the tires and/or, to atmosphere for venting the conduits and relieving pressure across the rotating seals.

The common conduit may also be pressurized by means of one or more quick release valves or the like to the average pressure of each or all of the various branch conduits. A single pressure transducer is provided in fluid communication with the common central conduit, remote from the wheel ends, for sensing a value indicative of the pressure or average pressure in the inflatable tires.

Typically, periodically (about every fifteen minutes) the CTIS would automatically check tire pressures to determine if correction is necessary.

While the on-board CTIS described above is highly advantageous as pressure venting is remote from the wheel ends and a single pressure transducer, located in a relatively well protected location remote from the wheel ends and/or the vehicle under carriage, can be utilized to sense tire inflation of the vehicle tires or groups of tires, the CTIS was not totally satisfactory as adaptive control methods were not provided to minimize the time required to deflate the tires to a selected pressure. Additionally, if a plurality of groups of tires, each group connected to the common conduit by a separate quick release valve, were being deflated, the prior art systems tended to deflate all of the tires only until the lowest pressurized group of tires was deflated to the selected inflation pressure.

SUMMARY OF THE INVENTION

In accordance with the present invention, the drawbacks of the prior art are minimized or eliminated by the provision of a CTIS control system having a method for reducing the total elapsed time during, and the variation in inflation pressure after, a deflation operation. Preferably, if a single transducer is utilized to simultaneously measure the pressure of a plurality of groups of tires, each group fluidly communicating with the transducer by means of a separate pressure quick release valve, the method will accurately deflate all of the groups to the selected inflation pressure.

The above is accomplished by causing the system to accurately calculate the time required to allow a venting tire to deflate to the selected inflation pressure and, preferably, if multiple groups of tires are being deflated, to deflate until a slightly lower than desired pressure is sensed and to then increase pressure (inflate) up to the desired level of pressurization. This deflation overshoot is required to balance the tire pressures in a short inflate action because deflation is inherently a flow control operation not necessarily resulting in all tires being deflated to equal pressure.

To determine the necessity and magnitude of a required inflation or deflation operation, the existing inflation pressure must be measured and then compared to the selected desired pressure. As fluid pressure of the controlled tire, tires or groups of tires in the present invention is measured by a single pressure transducer located remote from the tire or tires, the system must be in a steady state condition during each measurement to accurately measure the pressure. Accordingly, minimizing the frequency or occurrences of pressure measurement operations, which interrupts the process of inflation or deflation to a desired pressure, will minimize the total elapsed time required for a complete inflate or deflate to desired pressure operation. Additionally, the volume of air that is pulsed into the tires, while normally negligible, becomes significant at relatively low inflation pressures. That quantity of air may be comparable to the amount of air that is exhausted during a relatively short deflation operation. Accordingly, unduly frequent pressure measurement can make deflation to a desired low pressure very difficult.

The present invention utilizes an adaptive control algorithm having control logic which, at the initiation of a deflate sequence, will deflate the tires for an initial calculated period of time, measure the pressure change occurring during the initial period of time, and, based upon this measurement and stored logic rules, calculate the expected period of time required to complete the deflate to desired pressure operation. The system will then deflate for the calculated period of time at the end of which pressure will again be measured to verify that desired pressure has been achieved or additional inflation or deflation is required. By this method, the frequency and occurrences of pressure measurements during deflation sequence are minimized.

The initial calculated period of time is calculated as a function of the initial pressure, the selected pressure and a predetermined rate of deflation corresponding to a maximum possible deflation rate under existing conditions. Subsequent calculations utilize a similar calculation and a rate of deflation based, at least in part, upon the rate of deflation during the previous deflation operation.

Accordingly, it is an object of the present invention to provide a new and improved central tire inflation system.

A further object of the present invention is to provide an improved central tire inflation system utilizing a control provided with adaptive control logic for minimizing the time required to inflate or deflate a control tire to a selected desired inflation system.

These and other objects and advantages of the present invention will become apparent from a reading of the following description of the preferred embodiments taken in connection with the attached drawings.

DESCRIPTION OF THE PREFERRED EMBODIMENT

Figure 1:
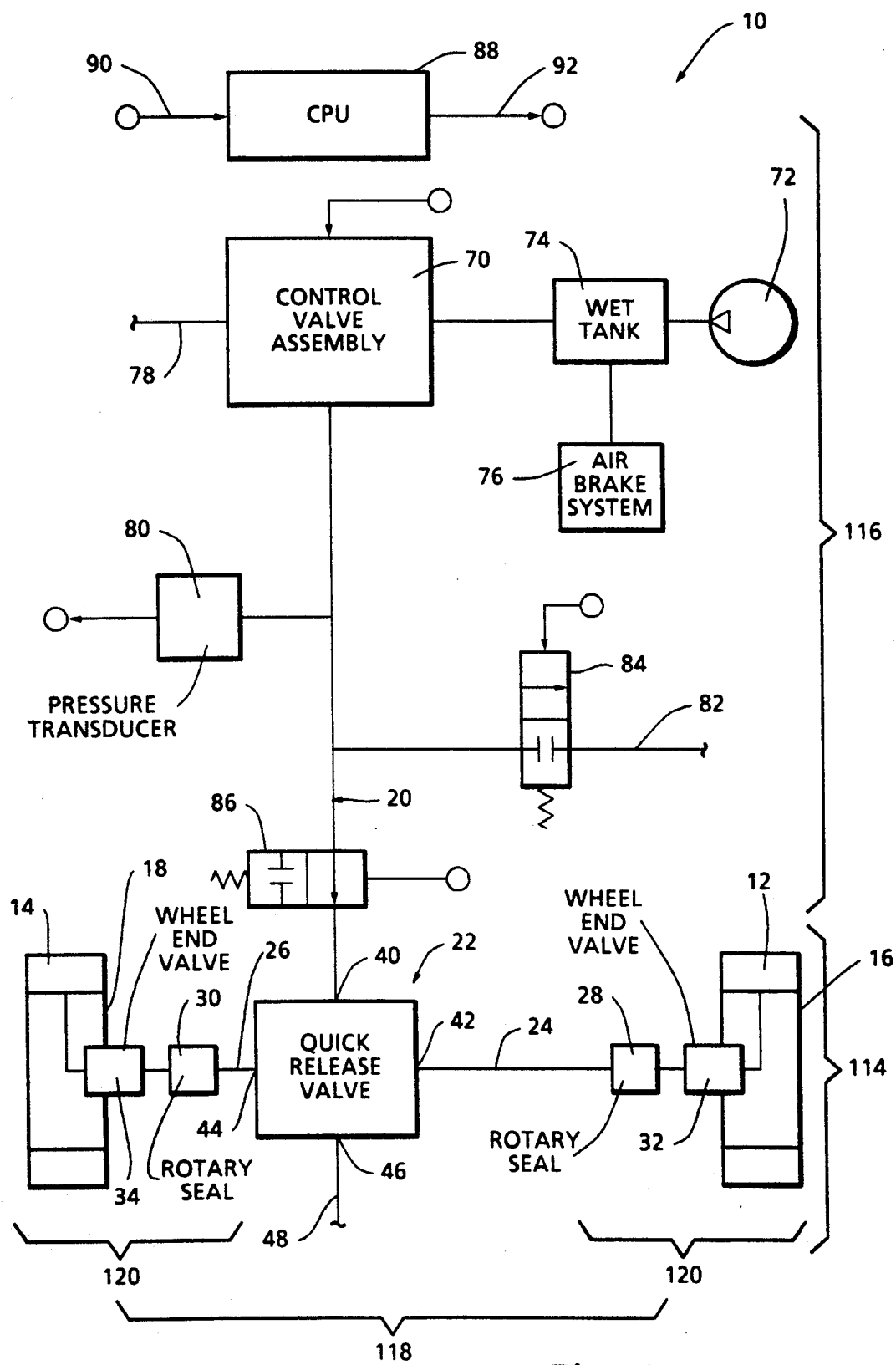
FIG. 1 is a schematic illustration of the pneumatic and electronic components of the present invention as utilized to control the inflation of groups of tires.

In the following description of the present invention, certain terms will be utilized for purposes of reference only and are not intended to be limiting. The terms "upward", "downward", "rightward" and "leftward" refer to direction in the drawings to which reference is made. The terms "inward", and "outward", respectively, refer to directions towards and away from, respectively, the geometric center of the device described. The terms "inflation" and "deflation", respectively, refer to actions to increase and decrease, respectively, pressurization of a tire or the like. Said terminology will include the words above specifically mentioned, derivatives thereof and words of similar import.

The advantages of varying the inflation pressure of the pneumatic tires (especially the driven tires) of a vehicle, especially a relatively heavy duty vehicle, in accordance with the terrain over which the vehicle is traveling are well known in the prior art and may be appreciated by reference to above-mentioned U.S. Pat. No. 4,640,331. Assuming, for example, the vehicle rear drive axle tires are normally inflated about 75 psi (pounds per square inch) for highway operation, decreasing the tire inflation pressure to be 35 psi for cross country travel over rough road or to about 20–25 psi for operation in sand, mud or snow conditions or to about 10–12 psi for severe emergency conditions, will result in the tire having a greater contact area (i.e. footprint), and improved traction. In addition to improved traction at lower tire inflation pressure, the vehicle will be able to maintain a higher speed over poor ground, and reduce wear and tear on the vehicle, because of the smoother ride over "washboard" type terrain. Conversely, to reduce operating temperature and wear and tear on the tires at highway speed, a higher tire inflation pressure is desired. Of course, to increase mobility, it is highly desirable that the tire inflation pressures be controllable from the vehicle cab from an on-board source of pressurized fluid and be variable and maintainable with the vehicle in motion as well as when the vehicle is at rest.

The CTIS control method of the present invention is especially well suited for the type of CTIS schematically illustrated in FIG. 1 and disclosed in above-mentioned U.S. Pat. No. 4,640,331. CTIS 10 measures and controls the inflation pressure of the interior pressurized chambers 12 and 14 of a group of tires 16 and 18, respectively, by causing the chambers to fluidly communicate with a common conduit, the pressurization of which conduit may be selectively increased, decreased, vented to atmospheric and/or measured. Tires 16 and 18 are typically grouped for this purpose as carried by an axle or set of axles and being of the same ideal inflation pressurization for various operating conditions.

Each of the inflatable chambers 12 and 14 of tires 16 and 18 are fluidly connected to a common quick release valve 22 by means of a branch fluid passage, 24 and 26, respectively. The fluid passages each include a rotary seal assembly, 28 and 30, and a wheel-end valve assembly, 32 and 34. The rotary seal assemblies may be of any construction, such as seen in U.S. Pat. No. 4,434, 833, the disclosure of which is incorporated by reference.

The wheel end valves 32 and 34 are normally closed to block fluid communication between the tire chambers and the quick release valve 22 and are effective to be selectively opened to fluidly communicate the tire chambers and valve 22. Wheel end valves 32 and 34 are preferably controlled by pressurization/evacuation in the conduits 24 and 26 and are opened or closed as a group. Wheel end valves 32 and 34 may be of the structures illustrated in above-mentioned U.S. Pat. Nos. 4,640,331 and 4,678,017.

The wheel end valves each have a first port, 32A and 34A, connected to the interior pressurized chambers of the tires and a second port, 32B and 34B, connected to the branch conduits.

Figure 2:
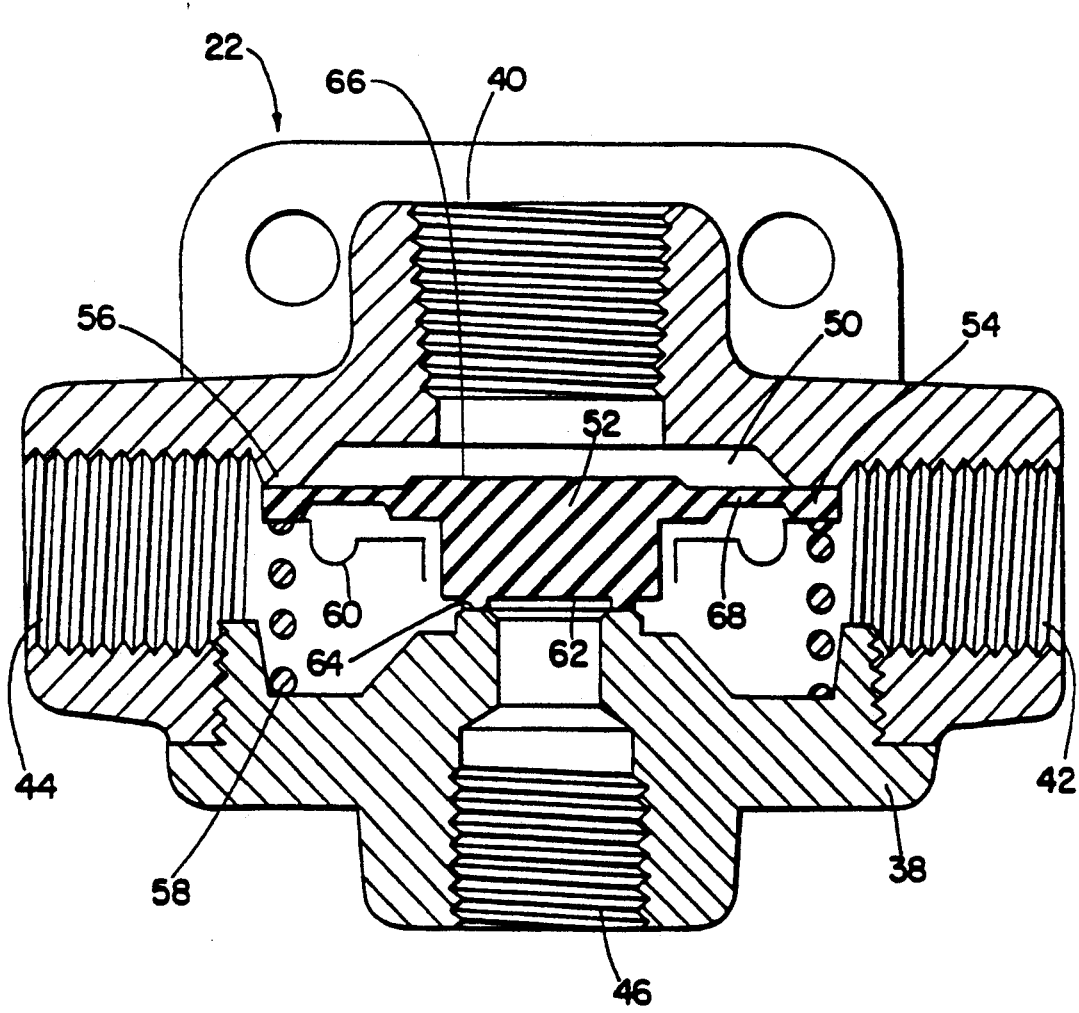
FIG. 2 is a section view of the quick release valve schematically illustrated in FIG. 1.

The structure and operational function of valve 22 may be seen in greater detail by reference to FIG. 2. Valve 22 includes a valve body 38 defining a first port 40 connected to common conduit 20, a second port 42 connected to passage 24, a third port 44 connected to passage 26 and a fourth port 46 connected to a vent passage 48 to atmosphere. The valve body 38 defines a central cavity 50 in which a valve member such as plug-type diaphragm 52 is received.

The outer periphery 54 of diaphragm 52 cooperates with an annular valve seat 56 to control the flow of fluid between port 40 and the fluidly communicating ports 42 and 44. A spring 58 and spring retainer 60 may be utilized to bias the outer periphery 54 into sealing contact with the valve seat 56. The central plug portion 62 cooperates with an annular valve seat 64 at port 46 to control the flow of fluid between ports 46 and the fluidly communicating ports 42 and 44. Diaphragm plug 62 is biased into sealing engagement with valve seat 64 by means of fluid pressure in conduit 20 acting on upper surface 66. The average pressure in passages 24 and 26 act upon the undersurface 68 of the diaphragm.

The operational characteristics of quick-release valve 22 are that a fluid flow (i.e. flow of higher pressurized fluid to a conduit or chamber at a lower pressurization) may be maintained from port 40 to ports 42 and 44. However, a fluid flow may not be maintained from ports 42 and 44 to port 40 as diaphragm 52 will lift to open ports 42 and 44 to the exhaust port 46. Further, the valve 22, by establishing fluid communication from port 40 to ports 42 and 44, and from the pressure of conduits 20, 24 and 26, ports 42 and 44 (conduits 24 and 26) to exhaust port 46, is effective to equalize at the pressurization of the lower pressurized of conduit 20 or average pressure of conduits 24 and 26.

It is important to note that quick-release valve 22 through which the various valves at the wheel end assemblies are vented, is located remote from the wheel end assembly and may also be located remotely from the control valve and pressure transducer to be described below.

If a pressure differential exists between tires 16 and 18, when the wheel end valves are opened and the conduit 20 is sealed, the pressure in conduit 20 will initially be the higher of the tire pressures and will decrease to an average of the tire pressures as the tires cross breath.

A control valve assembly 70 is connected to a source of pressurized fluid, such as on-board compressor 72. Typically, compressor 72 will communicate with a vehicle air brake wet tank 74 which will supply the air brake system 76 with a higher priority than the CTIS control valve assembly 70. The control valve assembly is also connected to a vent passage 78 to atmosphere and to the central conduit 20.

The control valve assembly is effective to selectively vent conduit 20 to atmosphere to vent passages 24 and 26, to pressurize conduit 20 to a relatively high pressure for inflation of the tires, to pressurize conduit 20 to a relatively low pressure to deflate the tires or to pulse conduit 20 with, a high pressure to open the wheel end valves 32 and 34 to allow conduit 20 to stabilize at the average pressure in the tire chambers. Preferably, if wheel end valves similar to those disclosed in above-mentioned U.S. Pat. Nos. 4,640,331 or 4,678,017 are utilized, pressurization and venting of conduit 20 is also effective to open and close, respectively, the wheel end valves.

A pressure transducer 80 is provided for sensing the pressurization of conduit 20 and for providing an output signal indicative thereof. To obtain an accurate measurement of average tire pressure, wheel end valves 32 and 34 must be opened and conduit 20 pressure in conduit 20 to attempt to stabilize at average tire pressure.

A second central conduit 82 and a pair of two-way/two-position valves 84 and 86 may be provided to allow the control valves assembly 70 and transducer 80 to be utilized to measure and control a different set of tires.

A central processing unit (CPU) 88, preferably microprocessor based, may be provided for controlling system 10. CPU 88 includes conditioning circuits 90 for receiving input signals, such as signals from pressure transducer 80, conditioning circuits 92 for issuing command output signals and logic (hardware or software) for defining logic rules by which the input signals are processed to generate command output signals. Preferably, at system start-up, or periodically during vehicle operation, it is desirable to have a system diagnostic routine or method to test for leakages or other system faults which may require discounting the normal system operation and adopting a modified mode of operation until the condition is repaired.

In operation, CPU 88 is effective to cause an automatic periodic pressure check to determine if corrective action is required. Typically, in the absence of a sensed system fault or leakage condition, such pressure check operation will be command at a relatively long interval, such as every fifteen or thirty minutes, from the last pressure check/pressure check operation.

As discussed in the above-mentioned U.S. Pat. No. 4,640,333, conduit 20 is pressurized to a first high supply pressure to open the wheel end valves and to cause tire inflation, conduit 20 is pressurized to the first high pressure to open the wheel end valves and then to a second regulated low pressure to cause tire deflation and is exhausted to atmosphere to close the wheel end valves and depressurize the various seals.

Figure 3:
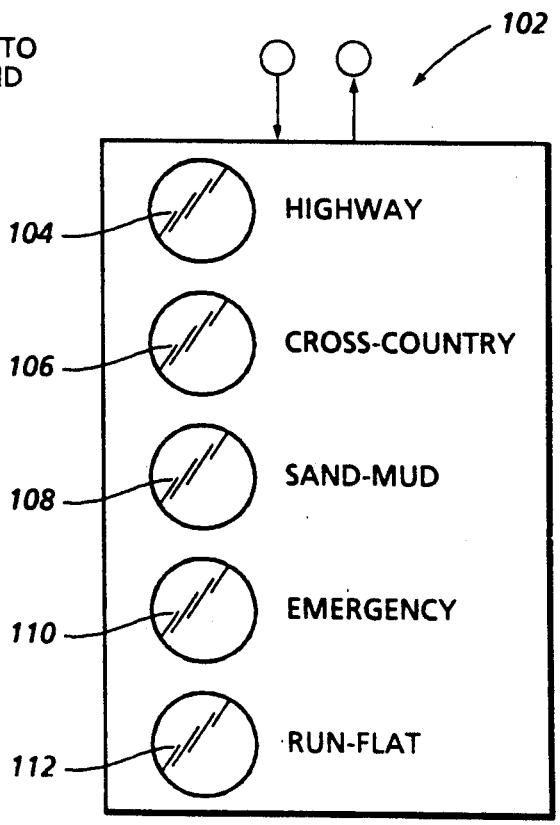
FIG. 3 is a schematic illustration of an operator's control panel.

In one embodiment, the vehicle operator is provided with a control panel 102, see FIG. 3, having five illuminatable buttons, 104, 106, 108, 110 and 112, by which a desired tire pressurization may be selected.

When the operator selects an inflation pressure different from the current operating Pressure, or during automatic periodic monitoring of current operating inflation pressures, the control unit must measure the current inflation pressure to determine if inflation and/or deflation is required to obtain or maintain the selected desired pressure.

The controller will then compare the present tire inflation pressure indicated by the signal from pressure transducer 80 to the desired tire pressure to determine if inflation or deflation is required. Should the controller determine that inflation is required, it will cause system 10 to assume its inflate mode of operation for a period of time. Should the controller determine that deflation is required, it will cause the system to assume its deflate mode of operation. Should the controller determine that no action is required, it will cause the system to assume its system shut-off mode of operation.

Should the control unit of system 10 determine by the measurement mode of operation that deflation of the tires is required, the system will assume the deflate mode of operation. In the deflate mode of operation, conduits 24 and 26 are initially pressurized to open the wheel end valves 32 and 34 and thus are at substantially tire pressure. Control valve assembly 70 will cause regulated pressure, such as 10 psi, to be present in conduit 20 and at port 40 of the quick-release valve 22. Maintaining the regulated pressure on the top of the diaphragm 52 of the quick-release valve 22 will cause conduits the tire chambers 12 and 14 to bleed down toward the regulated pressure. As a pressure differential will exist between the interior chambers 12 and 14 of tires 16 and 18 and the Port 40 of value 22, will continue to deflate and air will be exhausted through the quick-release valve Port 46. After the period of time, the deflate valve will be closed, the common conduit will be pressurized to the average tire pressure and system pressure will be measured to determine if further deflation and/or inflation is required.

As indicated above, each complete deflation operation comprises a series of cycles each comprising the system assuming the deflation mode of operation during which tire pressure is decreased through the quick release valve and the system assuming the measurement mode of operation during which pressure is measured and compared to a reference value to determine if further inflation or deflation is required. The pressure measurement mode requires closing of certain valves and waiting for pressure conditions to stabilize prior to taking a pressure reading.

By utilizing the method described below, the frequency and occurrences of required pressure measurement, and the time required to place the system in the pressure measurement mode of operation, may be minimized thus minimizing the total time required to deflate the tires from an initial pressurization to a desired pressurization. Use of the method of the Present invention will also tend to minimize excessive deflation of the tires during deflation operation which might occur if the system were allowed to remain in the deflation mode of operation for a period of time not based upon rate of deflation related to the current conditions of the central tire inflation system.

The control unit will determine that a deflation operation is required when currently sensed tire pressure, $P_o$, exceeds desired pressure, $P_D$, by greater than an acceptable error value.

The CPU 88, based upon the values of current pressure, $P_o$, and desired pressure, $P_D$, will, for the initial deflation cycle, calculate the time duration, $T_o$, for the initial deflation cycle utilizing a predetermined rate of deflation corresponding to the maximum possible rate of deflation from $P_o$ to $P_D$. In practice, the predetermined rate is usually based on the ideal flow rate of the wheel valves with no other components or conduits in the system and is thus higher than the actual rate of deflation.

At completion of the first or initial deflation cycle (i.e. after $T_o$), the system assumes the measurement mode and re-measures tire pressure, $P_1$. Based upon the values of $P_1$ and $P_D$, and a calculated rate of deflation which is a function of $P_1$, $P_D$ and the initial rate of deflation which is a function of $P_o$, $P_1$ and $T_o$, a time period $T_1$ for the second deflation operation is calculated. The time period for subsequent deflation cycles, if required, is calculated in a similar manner.

As may be seen, the deflation cycles subsequent to the initial cycle are of a duration calculated upon sensed current system conditions and thus tend to minimize the number of cycles, and thus the total elapsed time, required to deflate the vehicle tires from an initial pressurization to a desired pressurization.

Rates of deflation will vary with current conduit blockage conditions, partially opened valves, various fluid flow obstructions as well as magnitude of current pressure ($P_o$ or $P_1$, etc.) and desired pressure ($P_D$).

Figure 4:
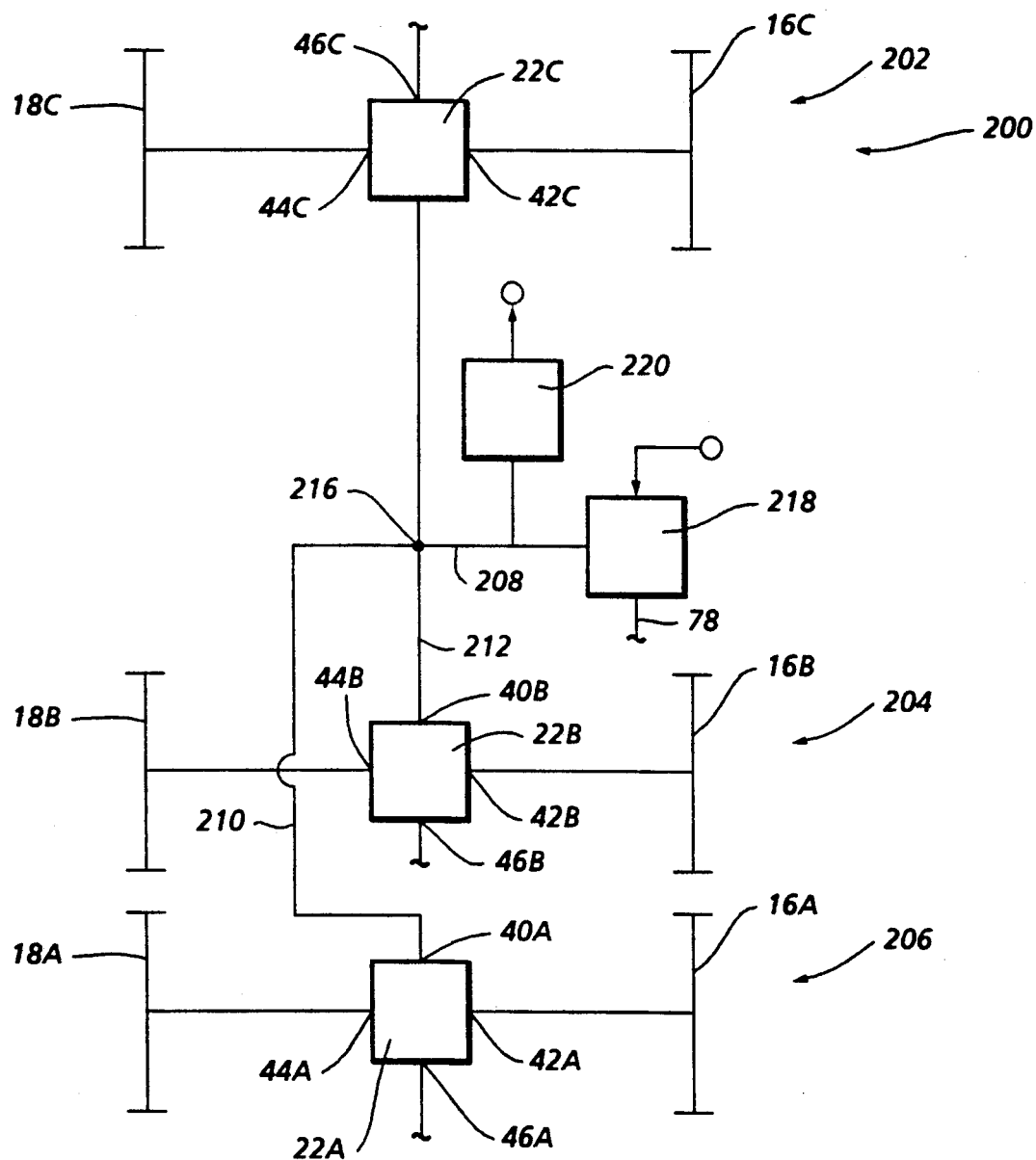
FIG. 4 is a schematic illustration of an alternate central tire inflation system.

A central tire inflation system 200 for a multi-axle vehicle, such as 6×6 truck, may be seen by reference to FIG. 4. In the description of central tire inflation system 200, elements which are structurally and functionally similar or identical to elements of system 10 described above will be assigned like reference numerals with a letter "A", "B" or "C" appended thereto. The central tire inflation system 200 will control the inflation of the four driven rear tires 16A, 18A, 16B and 18B and of the two driven front tires 16C and 18C. Although the rear tires are illustrated as single tires, it is understood, of course, that a group of tires may be substituted therefore as is well known in the prior art. Tires 16C and 18C are located on opposite ends of a front drive steer axle 202 while tires 16B and 18B are located at opposite ends of a front-rear tandem drive axle (204) and tires 16A and 18A are located on opposite ends of a rear-rear tandem drive axle (206).

Each of the axles includes a wheel-end assembly defining a rotary seal and a tire valve assembly comprising valves substantially identical to the rotary seals and wheel end valves described above.

Tires 16A and 18A, 16B and 18B, and 16C and 18C, respectively, define groups of tires communicating with a central conduit 208 by means of axle conduits 210, 212 and 214, respectively, which meet at junction 216 with conduit 208. Each of the axle conduits 210, 212, 214, respectively, communicates with a port 40A, 40B or 40C of a quick release valve 22A, 22B or 22C, respectively. The quick release valves, 22A, 22B and 22C are each substantially structurally and functionally identical to release valve 22 described above and illustrated in FIG. 2.

Each of the quick release valves defines ports 42A, 44A, 42B, 44B, and 42C, 44C leading to the tire Pressurized chambers. Each of the quick release valves also has a port 46A, 46B or 46C vented to atmosphere.

As may be seen by reference to FIG. 4, ports 40A, 40B and 40C are in fluid communication with one another and with conduit 208. Conduit 208 is controlled by control valve assembly 218 substantially identical to control valve assembly 70 described above and is fluid communication with a pressure transducer 220 substantially identical to transducer 80 described above.

During the pressure measurements of a deflation operation, by operation of the quick release valves 22A, 22B, 22C, the conduit 208 will stabilize at the pressurization of the average pressure of one tire group, 16A-18A, 16B-18B or 16C-18C, having the lowest average pressure. Accordingly, if during a deflation operation, the deflation of all of the tires is terminated upon achieving a reading at transducer 220 equal to the desired pressure, one or more of the other groups of tires may be inflated to considerably higher than desired pressure.

To minimize the above drawback, the CTIS controller will select a target pressure $P_T$, and continue the deflation operation until the target is sensed, which is lower than the actual desired inflation pressure, usually above two to four psi lower than desired pressure $P_D$. The tires will then be inflated to the desired pressure by one or more inflation operations. For example, if the operator selects a change from "Highway" (about 75 psi) to "Cross Country" (about 35 psi) operation by pushing button 106, the CPU 220 will command a deflation to a target pressure of 32 psi followed by an inflation to the desired pressure of 35 psi.

After achieving a sensed target value of 32 psi in conduit 208, inflation pressurizing of conduit 208 by the control valve will tend to cause the lower pressurized group or groups of tires to increase pressure relative to the higher pressurized groups of tires, if any, to assume a relatively accurate equalization of pressurization between the groups of tires.

Figure 5A:
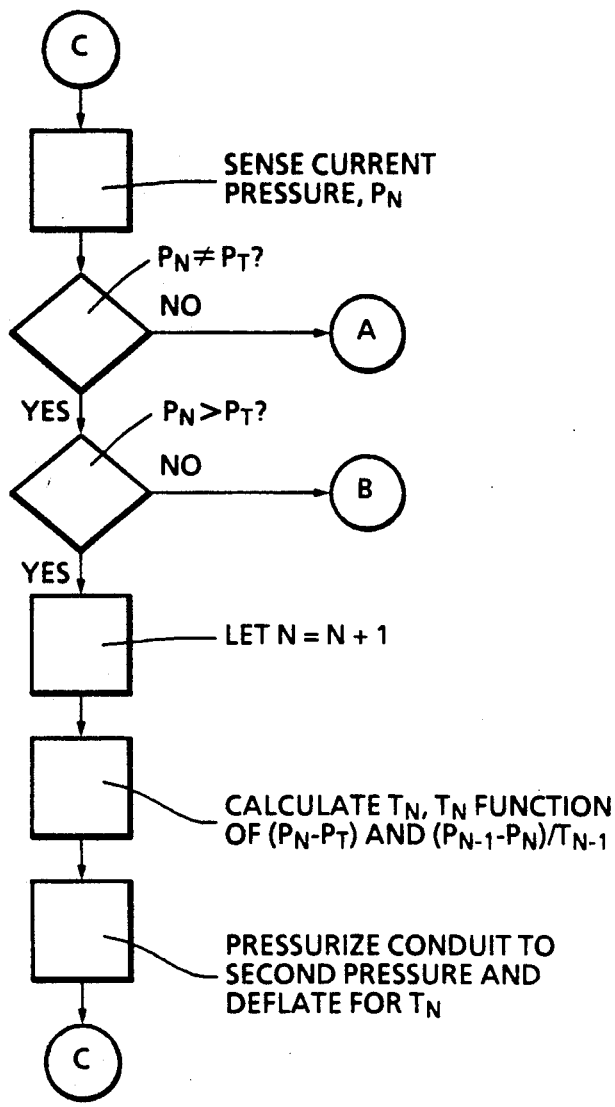
FIG. 5-5A are a symbolic illustration, in the form of a flow chart, illustrating the preferred manner of practicing the present invention.
Figure 5:
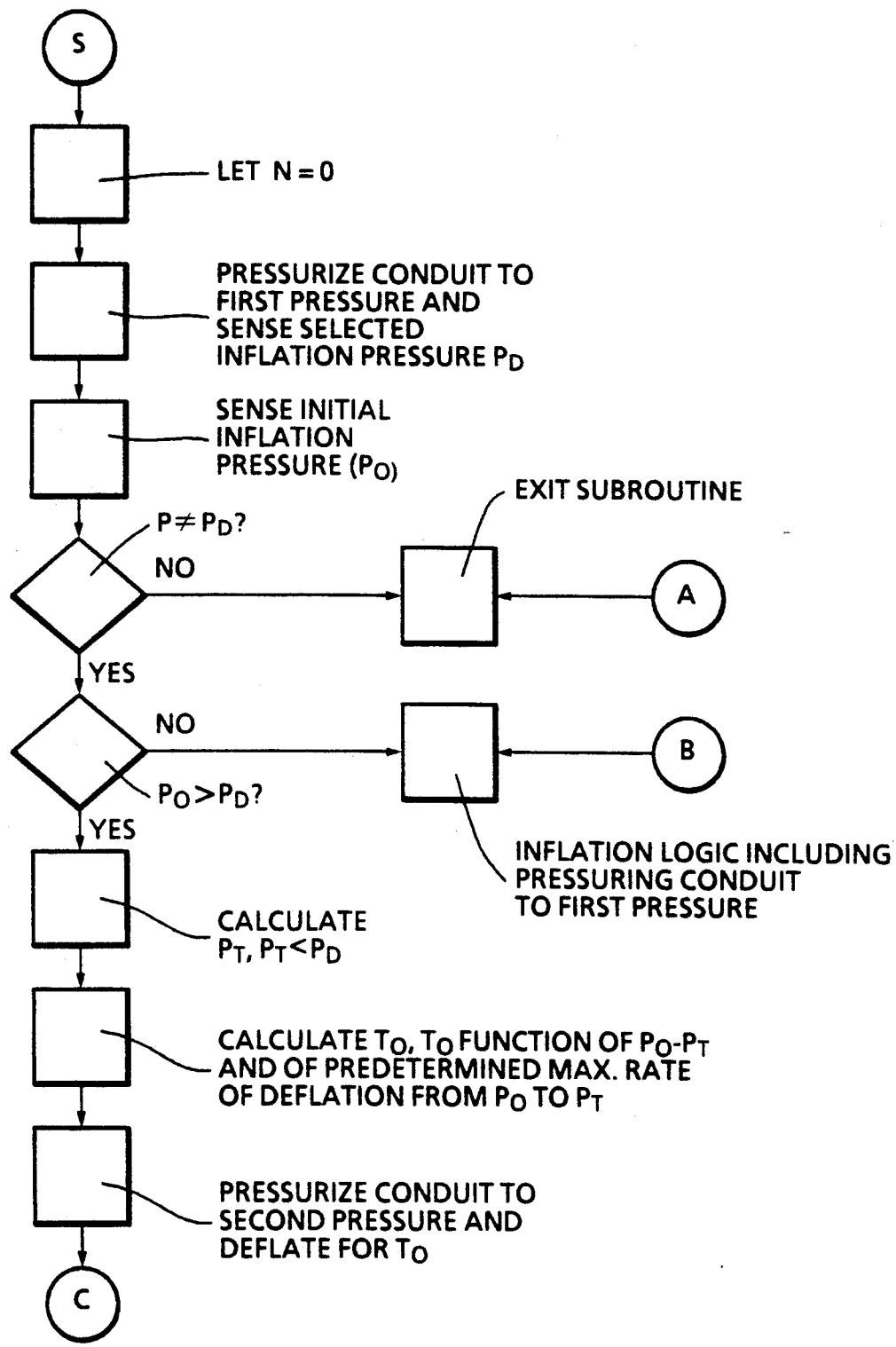

A flow chart symbolically illustrating the preferred manner of practicing the present invention may be seen by reference to FIGS. 5-5A. As may be seen by reference to FIG. 1, CTIS 10 includes an at-axle portion or portions 114 and a remote portion 116 which may be located anywhere on the vehicle, preferably at a relatively protected location. Further, the at-axle portions 114 of system 10 comprise a stationary portion 118 and rotating portions 120.

Figure 6:
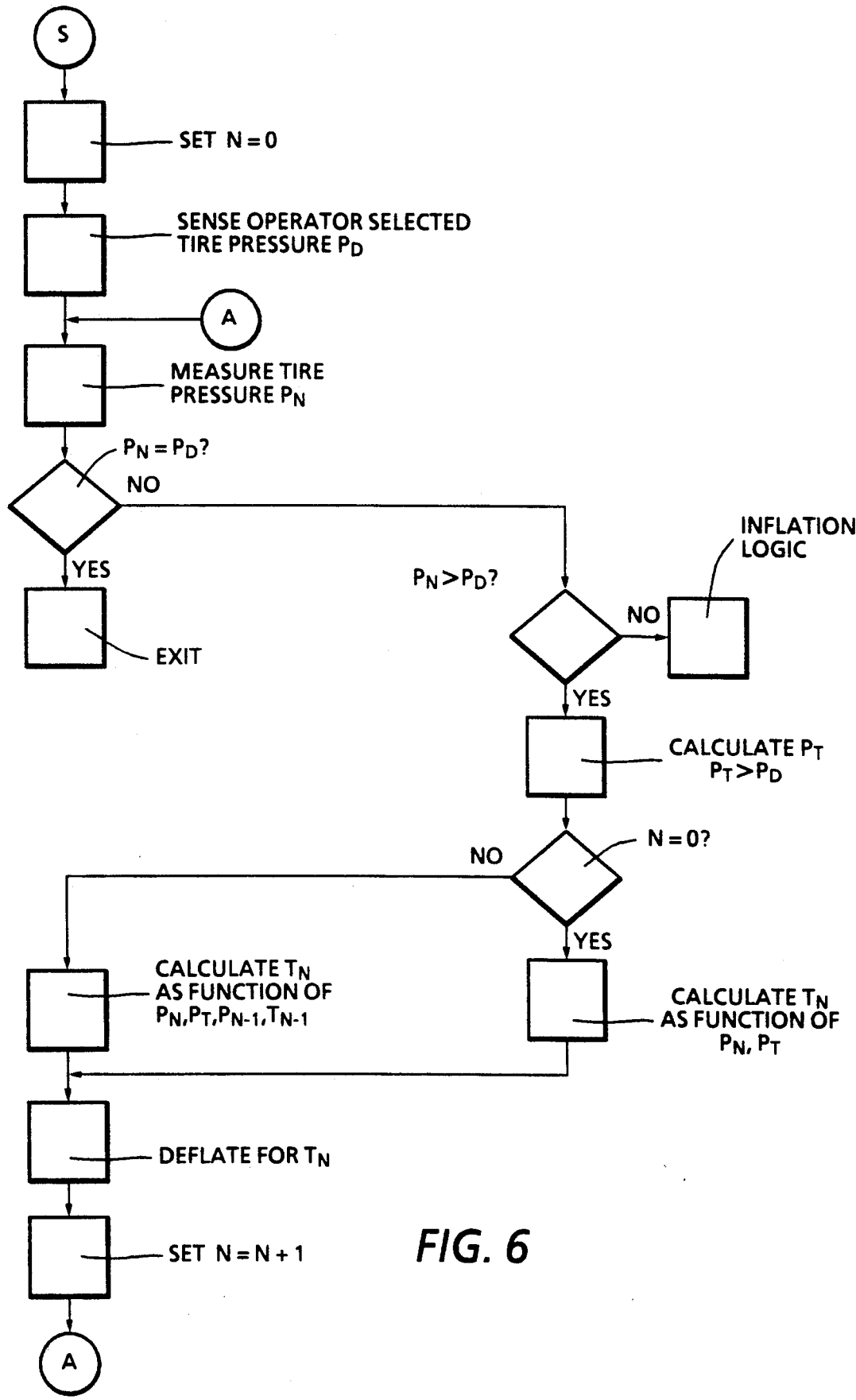
FIG. 6 is a symbolic illustration, in the form of a flow chart, illustrating an alternative manner of practicing the present invention.

An alternate manner of practicing the present invention may be seen by reference to FIG. 6. In this logic routine, prior to calculating an deflation overshoot target value $P_T$, if the measured pressure $P_N$ is equal to desired pressure $P_D$, the deflation operation is considered as completed.

Although the preferred embodiments of the present invention have been described with a certain degree of particularity, it is understood, of course, that certain substitutions for and rearrangement of the parts may be resorted to without departing of the spirit and the scope of the present invention as hereinafter claimed.

We claim:

1. A method for simultaneously controlling the inflation pressure of a plurality of fluidly separable inflatable tires, said method comprising the steps of:
   a. providing a central tire inflation system including an operator's control device (102) for selection of one of a plurality of selectable desired inflation pressures, a connection to a source of pressurized fluid, an exhaust means, a selectively pressurized and exhausted conduit, said conduit pressurized by said source to a single positive pressure greater than any of said selectable desired inflation pressures or to a single positive pressure lower than any of said selectable desired inflation pressures, tire valves (32, 34) at each of said tires, said tire valves automatically responsive to pressurization of said conduit to simultaneously connect the interior pressure chambers of all of said tires of said conduit pressurized to said single positive pressure lower than any of said selectable desired inflation pressures, to connect the interior pressure chambers of all of said tires to said conduit pressurized to said single positive pressure greater than any of said selectable desired inflation pressures or to seal said interior pressure chambers, a pressure transducer remote from the inflatable tires and a central processing unit (88) for receiving input signals from said pressure transducer and said control device and for processing same in accordance with predetermined logic rules to issue command output signals to control the pressurization of said conduit;
   b. sensing the selected desired inflation pressure of the inflatable tires;
   c. exposing the pressure transducer to a fluid pressure substantially equal to the inflation pressure of one of said tires to measure and store an initial inflation pressure value;
   d. comparing the initial inflation pressure value to the desired pressure value;
   e. if said initial inflation pressure value exceeds said desired pressure value,
      (i) calculating a target pressure value having a value less than said desired pressure value;
      (ii) then causing in sequence the interior pressure chambers of all of said inflatable tires to be connected to the conduit pressurized to said single positive pressure lower than any of said selectable desired inflation pressures and then exposing the pressure transducer to a fluid pressure equal to the inflation pressure of one of said tires to measure an updated pressure value until the updated measured inflation pressure value is substantially equal to said target pressure value, and
      (iii) then causing the interiors of all of said tires to be connected to said conduit pressurized to said single positive pressure greater than any of said selectable desired inflation pressures until the measured inflation pressure value substantially equals said selected desired pressure value.

2. The method of claim 1 wherein said target inflation value is in the range of two-to-five psi less than said selected desired pressure value.

3. The method of claim 1 wherein said one of said inflatable tires is the tire having the lower inflation pressure at the time of measurement.

* * * * *